United States Patent [19]
Hamasaka

[11] 3,937,629
[45] Feb. 10, 1976

[54] HANDLEBAR EXTENDER

[76] Inventor: Paul A. Hamasaka, 2322 Amherst Ave., Los Angeles, Calif. 90064

[22] Filed: Sept. 23, 1974

[21] Appl. No.: 508,382

[52] U.S. Cl. ............... 74/551.8; 74/551.9; 280/289
[51] Int. Cl.² ......................................... B62K 21/12
[58] Field of Search............ 74/551.9, 551.8, 551.3, 74/551.1; 280/289

[56] References Cited
UNITED STATES PATENTS

| | | | |
|---|---|---|---|
| 599,564 | 2/1898 | Kintner | 74/551.9 |
| 615,793 | 12/1898 | Bowman | 74/551.9 |
| 717,662 | 1/1903 | Ellison | 74/551.8 |

*Primary Examiner*—Samuel Scott
*Assistant Examiner*—F. D. Shoemaker
*Attorney, Agent, or Firm*—Nilsson, Robbins, Bissell, Dalgarn & Berliner

[57] ABSTRACT

Extenders for the ends of the handlebars of a motorcycle or the like, each extender comprising a bracket formed to rotatably encircle the handlebar end and an extension member rigidly and integrally joined to the bracket. The extension member includes a first portion projecting rearwardly from the bracket and a return portion in the pivot plane of the bracket constituting a hand grip.

4 Claims, 3 Drawing Figures

U.S. Patent Feb. 10, 1976 3,937,629
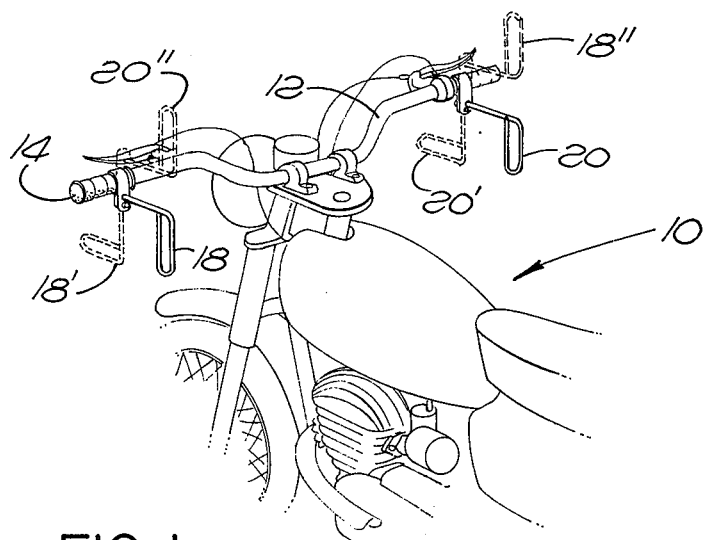
FIG. 1.
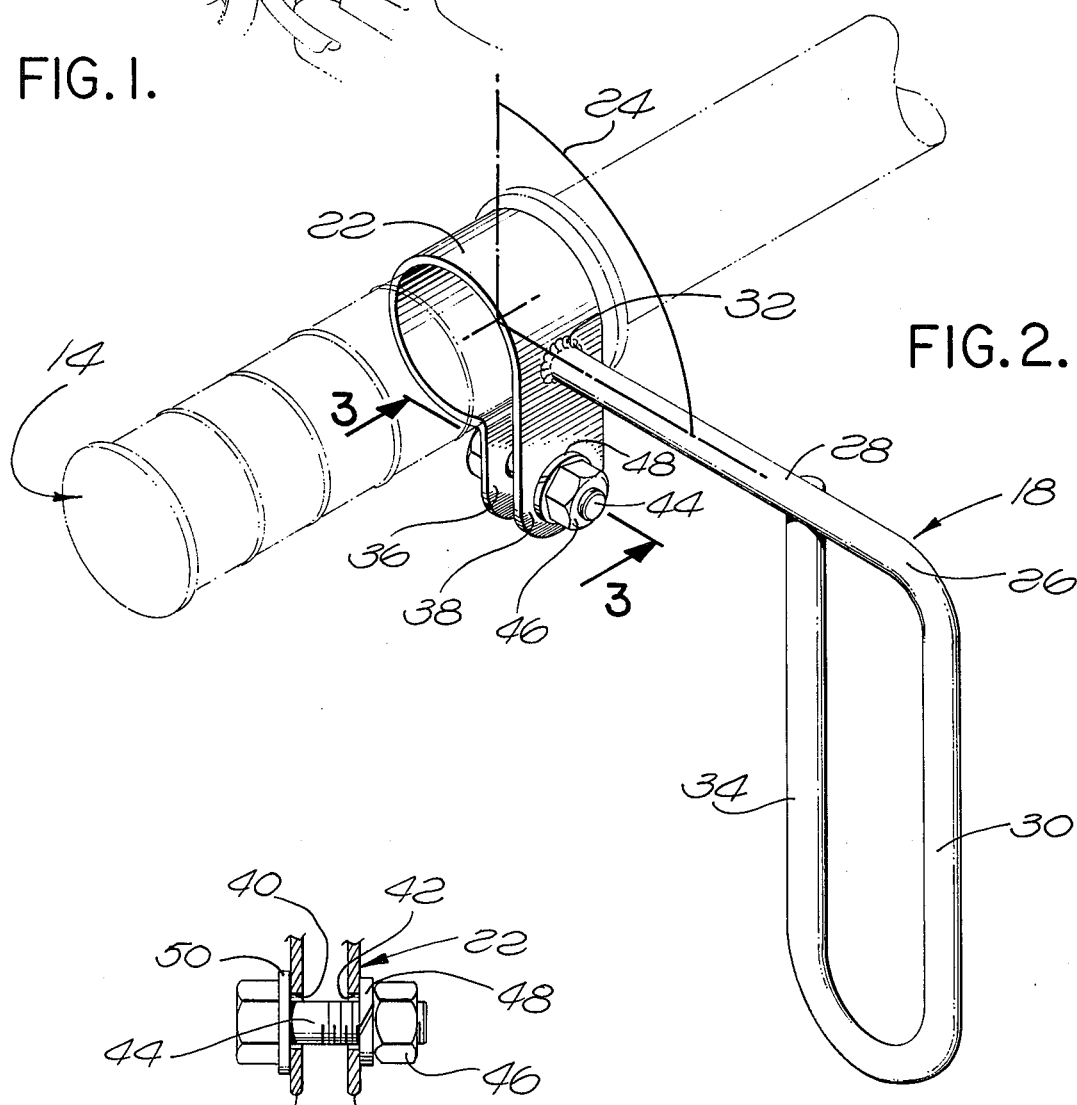
FIG. 2.
FIG. 3.

HANDLEBAR EXTENDER

FIELD OF THE INVENTION

The fields of art to which the invention pertains include the fields of levers, length extenders, handles and grips.

BACKGROUND AND SUMMARY OF THE INVENTION

Motorcycle handlebars are constructed with a fixed, rigid shape and are generally designed so that one cannot easily vary their disposition or pitch, or the location of the hand grips at their ends. However, it is often desirable to obtain such variation to suit different patterns of use. For example, in the city one generally rides with the top portion of his body upright or somewhat leaning over toward the handlebar. On the other hand, for long distance riding on highways and the like, one often desires to lean back away from the handlebar as such a position is more comfortable for extended trips. To accomodate the varying patterns of driving, variously shaped handlebars are available which can be substituted one for the other, depending upon the mode of driving desired. However, it will be appreciated that handlebars are not substituted with ease but a substantial degree of dismantling is required and the ownership of more than one handlebar requires an outlay of capital adding undesirable expense to the ownership and full enjoyment of a motorcycle.

The present invention provides an inexpensive, easily usable device for extending the ends of the handlebar of a motorcycle or the like, which is easily applied to the ends of an existing handlebar and which can readily be positioned out of the way or positioned for use with little bother.

In particular, handlebar extenders are provided, one for each end, each comprising as a single integral unit a bracket formed to rotatably encircle the handlebar at an end and an extension member rigidly joined to the bracket and projecting outwardly therefrom. The extension member projects in the plane of pivot of the bracket around the handlebar end and is formed with a return portion also in the bracket's plane of pivot, the return portion constituting a hand grip. Specifically, the extension member is formed from an elongate rod bent to form the projecting portion and return portion and in a particular form the return portion of the rod is bent back on itself 180 degrees to form the hand grip. The bracket comprises a resiliently rigid band having a pair of dependent lugs at the ends thereof which are formed with aligned openings. The bracket is secured at a desired rotational position about the handlebar end by means of a bolt insertable through the openings and a nut therefor. When it is desired to extend the handlebar, the extenders are rotated to project rearwardly from the handlebar ends and secured thereat. During city or other short trip use, the extenders are rotated to a position downwardly dependent from the handlebar and therefore out of the way. Other features of the invention will be explained hereinafter.

Prior art comprises U.S. Pat. Nos. 599,564 and 3,481,218.

BRIEF DESCRIPTION OF THE DRAWINGS

FIG. 1 is a perspective view of a motorcycle having a handlebar to which the extenders of the present invention are attached and in operative position, an inoperative position being shown in shadow;

FIG. 2 is a perspective view of one end of a motorcycle handlebar showing the extender attached thereto in operative position; and FIG. 3 is a cross-sectional view of a portion of the bracket, taken on line 3—3 of FIG. 2 in the direction of the arrows.

DETAILED DESCRIPTION

Referring to FIG. 1, a motorcycle 10 is shown having a handlebar 12 with ends 14 and 16. The handlebar 12 is formed with a relatively shallow curve in the shape usually employed by motorcyclists for city, short-trip riding. Each handlebar end 14 and 16 is equipped with an extender 18 and 20 of the present invention which extends the motorcyclist's grip rearwardly of the handlebar ends, as will be described in more detail hereinafter. As shown in shadow at 18' and 20' the extenders 18 and 20 can be rotated on the handlebar ends 14 and 16 so as to depend downwardly therefrom and can be secured in such downward position, out of the way, when it is desired to use the grips usually provided on the handlebar 12. Additionally, if desired, the handlebars can be used in an upwardly jutting position by exchanging right for left as shown at 18'' and 20''.

The manner of construction of the present handlebar extender 18 is shown in detail in Figure 2. For illustrative purposes, only one extender is shown, in this case the left hand extender, but it will be appreciated that the right hand extender is symmetrical thereto. The extender 18 is formed as a single integral unit and includes a bracket 22 formed to rotatably encircle the handlebar at the end 14 thereof, thereby defining a plane of pivot, indicated by the arc segment 24, about the handlebar end 14. The extender 18 includes an extension member 26 defined by an elongate rod which is bent to form a projection portion 28 and a return portion 30. The projection portion 28 of the rod extends rearwardly at a 90° angle from the bracket 22 and is secured to the bracket 22 by welding thereto as shown at 32. Importantly, the projection portion 28 projects outwardly from the bracket in the pivot plane 24 thereof and the return portion 30 is formed dependent from the projection portion, also in the pivot plane 24. It is such rigid disposition in a pivot plane of the handlebar end 14 that permits the extender to safely and securely operate as desired and enables it to be readily and easily rotated out of the way.

In order to provide a more desirable gripping characteristic to the extender 18, the return portion 30 is bent back on itself 180° and continued as a substantially parallel portion 34 toward the projection portion 28. The parallel porition 34 extends upwardly to meet the projection portion 28 on one side thereof, the tension thereby imparted aiding in rigidifying the grip formed by the return and parallel portions 30 and 34. While both left and right hand extenders can have exactly the same configuration, it has been found that a more comfortable configuration for the grip formed by the return and parallel portions 30 and 34 is obtained when, with each extender, the parallel portion 34 meets the projection portion 28 on the inner side thereof.

Referring additionally to FIG. 3, the bracket 22 is formed of a resiliently rigid band, e.g., of steel, having a pair of dependent lugs 36 and 38 at the ends thereof. The lugs 36 and 38 are formed with aligned openings 40 and 42 through which is inserted a bolt 44 and which is secured by means of a nut 46 against one lug 38 and a split ring 48 and washer 50 against the opposite lug 36.

In operation, one need simply slide the bracket 22 with the bolt 44 removed, over the handlebar end 14, the bracket having sufficient resiliency to enable opening thereof for such sliding. Thereafter, the bolt 44 is inserted and secured by means of the nut 46, split ring 48 and washer 50, and tightened to securely mount the extender 18 on the handlebar end 14 with the extender projecting rearwardly from the handlebar. In such disposition, a motorcyclist can simply hold the grip 30–34 of the extender 18, and a corresponding grip of the extender 20 on the right side of the motorcycle, and lean back in a comfortable, highway position of riding.

It will be noted that motorcycles are conventionally provided with a throttle mechanism connected to the right hand handlebar grip 16 which grip 16 is rotatable for acceleration of the motorcycle. The right hand extender can be placed directly on such grip and itself can be used to accelerate the motorcycle by rotating the extender in the pivot plane of the handlebar grip 16. It is also possible to make other changes or additions to suit the tastes of individual users. For example, the grip 30–34 is designed so that a hollow rubber grip of conventional shape can be placed thereon, if desired.

I claim:

1. A handlebar extender, comprising as a single integral unit a bracket formed to rotatably encircle said handlebar at an end thereof to define a pivot plane thereabout, and an extension member comprising an elongate rod rigidly joined to said bracket, said rod being bent to form a first portion projecting outwardly from said bracket in said pivot plane and a return portion bent about 180° and continued as a substantially parallel portion to contact said first portion on one side thereof to form a hand grip, said extender further comprising means for securing said bracket against rotatable movement on said handlebar.

2. The extender of claim 1 wherein said bracket comprises a resiliently rigid band having a flat portion, said first portion projecting about 90 degrees from said bracket flat portion.

3. The extender of claim 1 wherein said bracket comprises a resiliently rigid band having a pair of dependent integral lugs at the ends thereof formed with aligned openings, and said securing means comprises a bolt insertable through said openings and a nut therefor.

4. The extender of claim 2 wherein said band has a pair of dependent integral lugs at the ends thereof formed with aligned openings, and said securing means comprises a bolt insertable through said openings and a nut therefor.

* * * * *